3,014,088
FLOATING SLEEVE INSULATOR

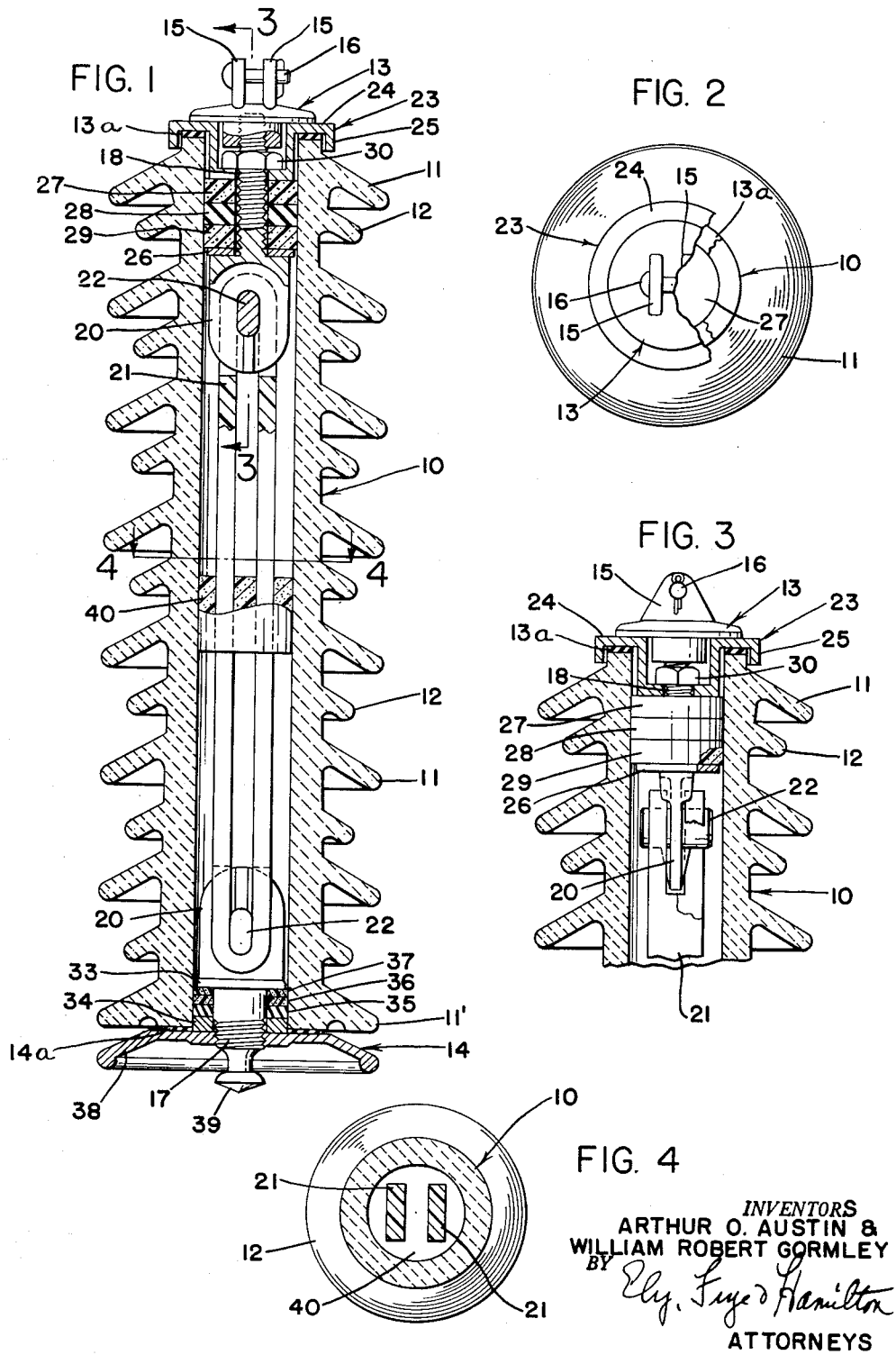

Arthur O. Austin and William Robert Gormley, Barberton, Ohio, assignors to A. O. Austin, Inc., Barberton, Ohio, a corporation of Ohio
Filed Jan. 18, 1960, Ser. No. 3,182
6 Claims. (Cl. 174—179)

The invention relates generally to insulators for high tension electrical power lines and the like, and more particularly to a sleeve type insulator which is subjected to tension loads at its ends.

Insulators of this type are shown in the prior patent to Arthur O. Austin, No. 2,175,336, and comprise an outer sleeve of dielectric material such as porcelain filled with oil or insulating compound, and having load-bearing heads clamped against the ends of the sleeve by an internal link of insulating material extending through the sleeve. As described in said patent, the insulating link is pre-loaded with sufficient tension that when the normal working loads are applied to the heads, the seal between the heads and the ends of the sleeve will not be broken. This pre-loading places the sleeve under compression. Because the working load must not exceed the pre-loading in order to maintain the seals, the ultimate working strength of the insulator is far below the actual tensile strength of the internal linkage.

An important object of the present invention is to provide an improved sleeve insulator in which substantially the ultimate strength of the core connecting the heads may be utilized with the outer sleeve floating between the heads and under substantially no compressive or tensile stress.

Another object is to provide an improved sealing construction within the heads to seal insulating liquid within the sleeve at all times regardless of the load applied to the heads.

These and other objects are accomplished by the simple and economical construction shown by way of example in the accompanying drawing and described in the following specification. Various modifications and changes in details of construction are comprehended within the scope of the invention defined in the appended claims.

Referring to the drawing:

FIG. 1 is a longitudinal sectional view of the improved floating sleeve insulator.

FIG. 2 is an end elevation thereof, partly broken away.

FIG. 3 is a fragmentary sectional view as on line 3—3 of FIG. 1.

FIG. 4 is a transverse section on line 4—4 of FIG. 1.

The outer sleeve, indicated generally at 10, is composed of a dielectric material such as glass or porcelain which will substantially prevent current leakage and resist weathering. As shown, the sleeve may be provided with a series of downwardly inclined annular drip flanges for directing moisture away from the sleeve. The flanges may be integral with the sleeve, and alternate flanges 11 and 12 may have different diameters as desired.

The sleeve 10 is floatingly held between an upper fitting including a head 13 and a lower fitting including a head 14, but the heads are not drawn up against the ends of the sleeve. The head 13 has ears 15 connected by a pivot pin 16 forming a clevis for attachment to a support, and the head 14 has a bolt 17 adapted for connection to the high tension cable of a power transmission line, in a usual manner.

The head 13 is attached to the upper end of a bolt 18, and the bolts 17 and 18 have inner attaching ears 20 which are connected by a tension link 21 of insulating material extending axially through the sleeve 10.

Preferably the link is made of reinforced flexible insulating material such as fabric treated with a synthetic resin, plastic material reinforced with fibers, or any suitable flexible insulating material which has high strength for a given cross section.

The link 21 is preferably in the form of a flat endless belt or loop and has a flat rectangular cross section as shown in FIG. 4, although the link may be a rigid rod if desired. The closed ends of the loop are slotted at each end to receive the ears 20 and pass over transverse keeper pins 22 extending through the ears. Thus, the load carried by bolt 17 is transmitted by the tension link to the bolt 18 and head 13.

A cup-shaped compressor washer 23 surrounds the bolt 18 and fits loosely within the upper end of the sleeve under the head 13. The upper end of the cup has a radial flange 24 abutting the head 13 and extending over a resilient washer 13a on the upper end of the sleeve, with a downturned lip flange 25 terminating over the slope of the top drip flange 11 on the sleeve to exclude moisture from within the sleeve.

Preferably, a washer 26 rests on the ear 20 at the base of bolt 18, and between the washer 26 and the compressor washer 23 is a series of elastomeric gaskets indicated at 27, 28 and 29. The number of elastomeric gaskets may be varied, but at least two should be used. A nut 30 on bolt 18 is adapted to compress the gaskets 27, 28 and 29 to cause them to expand radially into sealing abutment with the inner wall of the sleeve.

The gaskets 27, 28 and 29 may be made of various materials so long as they are sufficiently soft and radially expansible when compressed axially to provide liquid-tight seals at their outer peripheries with the inner wall of the sleeve. The inner gasket 29 may be of oil-resistant material such as neoprene so that it is resistant to the oil filling the sleeve for insulative purposes, and may be sponge so that it will absorb some oil to help compensate for expansion due to temperature changes.

For example, gasket 27 may be sponge rubber, gasket 28 natural rubber, and gasket 29 neoprene or synthetic sponge. The bolt 17 at the lower end of the sleeve has an annular shoulder 33 connected to its ear 20, and a metal washer 34 surrounds the bolt in abutment with head 14. Between the washer 34 and shoulder 33 is a series of elastomeric gaskets 35, 36 and 37 substantially corresponding to the gaskets 27, 28 and 29, respectively. Here again, the number of gaskets may be varied, but at least two should be used.

The material of the gaskets 35, 36 and 37 may, for example, be as follows: 35—natural rubber, 36—neoprene or synthetic sponge, and 37—oil-resistant neoprene or synthetic sponge. Thus, the gaskets at both ends of the sleeve include at least one of natural rubber and one of oil-resistant synthetic rubber.

As shown in FIG. 1, the nut 30 is drawn against the compression cup 23 to expand the gaskets 27, 28 and 29 radially into sealing contact with the sleeve 10, and the head 14 is drawn against the metal washer 34 to expand the gaskets 35, 36 and 37 into sealing contact with the sleeve. When the compression on the gaskets is sufficient to effect liquid-tight sealing at the peripheries of the gaskets, the washer 13a may be slightly compressed, as well as a similar resilient washer 14a between the head plate 14 and the other end of sleeve 10, so that no substantial compression is applied to the sleeve. The bottom annular drip flange 11' of the sleeve overhangs the downwardly sloping skirt 38 of head plate 14 so that moisture is restrained from flowing radially inward of the head plate. The skirt 38 acts as a shield around the attaching end 39 of bolt 17 to decrease static leakage.

When the sleeve and core mechanism is assembled, the space surrounding the tension link 21 is filled with insulating liquid such as oil and preferably a relatively large oil-resistant compressible synthetic sponge gasket 40 is provided around the central part of link 21, to compensate for expansion and contraction of the oil. The nut 30 and head plate 14 are drawn up on the bolts 18 and 17 to axially compress the gaskets 27, 28 and 29, and 35, 36 and 37, and radially expand them into tight sealing abutment with the inner wall of the sleeve 10, without causing the heads 13 and 14 to exert any substantial pressure on the ends of the sleeve.

Now when the load is applied to the heads with the insulator in use, the load will be transmitted through the core comprising tensile link 21 and bolts 17 and 18 without applying any stress whatever to the sleeve 10. The ultimate tensile strength of the tensile core is designed to be substantially greater than the maximum load to which it will be subjected, in accordance with good engineering practice.

Accordingly, it is not necessary to pre-load the insulator to maintain the seals at the ends of the sleeve, and substantially the full strength of the core (minus a suitable safety factor) can be utilized because no loading stress is applied to the sleeve.

What is claimed is:

1. An insulator for high tension electrical power lines and the like, comprising an outer sleeve of insulating material, bolts extending within the ends of said sleeve, a tension link of insulating material extending axially through said sleeve and connecting said bolts, exterior load-carrying heads attached to said bolts and spaced from the ends of said sleeve, a plurality of elastomeric gaskets around each of said bolts and peripherally contacting said sleeve, and means axially compressing and radially expanding said gaskets into sealing abutment with the inner wall of said sleeve to contain insulating liquid therein.

2. An insulator for high tension electrical power lines and the like, comprising an outer sleeve of insulating material, load-carrying fittings extending within the ends of said sleeve, a tension link of insulating material extending axially through said sleeve and connected at its ends to said fittings, a plurality of elastomeric gaskets around each of said fittings within and peripherally contacting said sleeve, and means axially compressing and radially expanding said gaskets into sealing abutment with the inner wall of said sleeve to contain insulating liquid therein.

3. An insulator for high tension electrical power lines and the like, comprising an outer sleeve of insulating material, bolts extending within the ends of said sleeve, a tension link of insulating material extending axially through said sleeve and connecting said bolts, exterior load-carrying heads attached to said bolts and spaced from the ends of said sleeve, a plurality of elastomeric gaskets around each of said bolts and peripherally contacting said sleeve, and means axially compressing and radially expanding said gaskets into sealing abutment with the inner wall of said sleeve to contain insulating liquid therein, the inner gasket around each bolt being oil-resistant absorbent sponge material.

4. An insulator for high tension electrical power lines and the like, comprising an outer sleeve of insulating material, load-carrying fittings extending within the ends of said sleeve, a tension link of insulating material extending axially through said sleeve and connected at its ends to said fittings, a plurality of elastomeric gaskets around each of said fittings within and peripherally contacting said sleeve, and means axially compressing and radially expanding said gaskets into sealing abutment with the inner wall of said sleeve to contain insulating liquid therein, the inner gasket around each fitting being oil-resistant sponge material.

5. An insulator for high tension electrical power lines and the like, comprising an outer sleeve of insulating material, bolts extending within the ends of said sleeve, a tension link of insulating material extending axially through said sleeve and connecting said bolts, exterior load-carrying heads attached to said bolts and spaced from the ends of said sleeve, at least two elastomeric gaskets around each of said bolts and peripherally contacting said sleeve, the inner gasket being oil-resistant synthetic rubber and the outer gasket being natural rubber, and means axially compressing and radially expanding said gaskets into sealing abutment with the inner wall of said sleeve to contain insulating liquid therein.

6. An insulator for high tension electrical power lines and the like, comprising an outer sleeve of insulating material, load-carrying fittings extending within the ends of said sleeve, a tension link of insulating material extending axially through said sleeve and connected at its ends to said fittings, at least two elastomeric gaskets around each of said bolts and peripherally contacting said sleeve, the inner gasket being oil-resistant synthetic rubber and the outer gasket being natural rubber, and means axially compressing and radially expanding said gaskets into sealing abutment with the inner wall of said sleeve to contain insulating liquid therein.

References Cited in the file of this patent

UNITED STATES PATENTS

| | | |
|---|---|---|
| 1,770,130 | Dunmire | July 8, 1930 |
| 2,175,336 | Austin | Oct. 10, 1939 |
| 2,639,310 | Hunt | May 19, 1953 |
| 2,924,644 | Cox | Feb. 9, 1960 |